(12) United States Patent
Mizuno et al.

(10) Patent No.: US 11,919,384 B2
(45) Date of Patent: Mar. 5, 2024

(54) RESIN FILLER TUBE AND MANUFACTURING METHOD FOR THE SAME

(71) Applicants: Sumitomo Riko Company Limited, Komaki (JP); HONDA MOTOR CO., LTD., Tokyo (JP)

(72) Inventors: Fumiya Mizuno, Komaki (JP); Tomoyuki Fukuyasu, Komaki (JP); Atsuo Miyajima, Komaki (JP); Yoshikazu Kaneyasu, Tokyo (JP); Nao Sato, Tokyo (JP); Tsubasa Suzuki, Tokyo (JP)

(73) Assignees: Sumitomo Riko Company Limited, Komaki (JP); HONDA MOTOR CO., LTD., Tokyo (JP)

( * ) Notice: Subject to any disclaimer, the term of this patent is extended or adjusted under 35 U.S.C. 154(b) by 574 days.

(21) Appl. No.: 17/130,096

(22) Filed: Dec. 22, 2020

(65) Prior Publication Data

US 2021/0188082 A1 Jun. 24, 2021

(30) Foreign Application Priority Data

Dec. 23, 2019 (JP) .................................. 2019-231091

(51) Int. Cl.
*B60K 15/04* (2006.01)
*B29C 48/00* (2019.01)
(Continued)

(52) U.S. Cl.
CPC .......... *B60K 15/04* (2013.01); *B29C 48/0011* (2019.02); *B29C 48/13* (2019.02);
(Continued)

(58) Field of Classification Search
CPC .............. B60K 15/04; B60K 2015/047; B60K 2015/0464; B29C 48/13; B29C 48/21; B29C 48/0011; B29K 2023/065
(Continued)

(56) References Cited

U.S. PATENT DOCUMENTS 5,386,923 A 2/1995 Nakashima et al.
8,596,226 B2 * 12/2013 McAnally .............. F23M 11/02
122/498

(Continued)

FOREIGN PATENT DOCUMENTS

JP 2003-194280 A 7/2003
JP 2007008352 A * 1/2007 ............. B29C 65/02
(Continued)

OTHER PUBLICATIONS

May 20, 2023 Office Action issued in Chinese Patent Application No. 202011478361.9.
(Continued)

*Primary Examiner* — J. Gregory Pickett
*Assistant Examiner* — Niki M Eloshway
(74) *Attorney, Agent, or Firm* — Oliff PLC

(57) ABSTRACT

A resin filler tube includes: a tubular body; a flange having a diameter greater than an outer diameter of the tubular body, a thickness greater than a thickness of the tubular body, and a predetermined width in an axial direction, and having a first axial end face forming a weld surface to be welded to an outer circumferential edge of an opening hole of a fuel tank; and a base-end-side reverse tapered portion which connects between an end of the tubular body on the fuel tank side and an end of an outer circumferential surface of the flange on a side opposite to the fuel tank side, and which is reversely tapered so as to increase a diameter toward the flange. The base-end-side reverse tapered portion has an
(Continued)

inner diameter that is not less than an inner diameter of the tubular body over an entire range in the axial direction.

14 Claims, 5 Drawing Sheets

(51) Int. Cl.
   *B29C 48/13*   (2019.01)
   *B29C 48/21*   (2019.01)
   *B29K 77/00*   (2006.01)
   *B29K 23/00*   (2006.01)
(52) U.S. Cl.
   CPC ........ *B29C 48/21* (2019.02); *B29K 2023/065* (2013.01); *B29K 2077/00* (2013.01); *B60K 2015/0464* (2013.01); *B60K 2015/047* (2013.01)
(58) Field of Classification Search
   USPC ....................................................... 220/86.2
   See application file for complete search history.

(56) References Cited

U.S. PATENT DOCUMENTS

| 8,636,163 | B2 | 1/2014 | Gebert et al. |
| 2010/0032436 | A1 | 2/2010 | Gebert et al. |
| 2018/0304741 | A1 | 10/2018 | Wakazono et al. |

FOREIGN PATENT DOCUMENTS

| JP | 2018-069786 A | | 5/2018 | |
| JP | 2018-118498 A | | 8/2018 | |
| JP | 2019156011 A | * | 9/2019 | ......... B29C 48/0019 |
| WO | 2010/015295 A1 | | 2/2010 | |
| WO | WO-2018139178 A1 | * | 8/2018 | ........... B29C 48/002 |
| WO | WO-2020003702 A1 | * | 1/2020 | ............. B60K 15/04 |

OTHER PUBLICATIONS

May 30, 2023 Office Action issued in Japanese Patent Application No. 2019-231091.

* cited by examiner

RESIN FILLER TUBE AND MANUFACTURING METHOD FOR THE SAME

CROSS REFERENCE TO RELATED APPLICATIONS

This application claims priority based on Japanese Patent Application No. 2019-231091 filed on Dec. 23, 2019, the entire contents of which are incorporated by reference herein.

1. TECHNICAL FIELD

The present invention relates to a resin filler tube and a manufacturing method for the resin filler tube.

2. BACKGROUND ART

WO2010015295A1 discloses that an outer circumferential edge of an opening hole of a fuel tank and a flange of a filler tube are fixed to each other by a clamp ring. An O-ring for sealing is disposed between an inner circumferential surface of the opening hole of the fuel tank and an outer circumferential surface of the filler tube.

JP2018-118498A discloses that an outer circumferential edge of an opening hole of a resin fuel tank and an axial end face of a flange of a resin filler tube are joined to each other by welding. The outer face of the resin filler tube has an outermost layer formed by an outermost layer material over the entire length. The outermost layer of the flange is welded to the fuel tank. Furthermore, a material having preferable weldability is used as the outermost layer material, whereby performance such as a welding strength of a weld surface is enhanced.

JP2018-69786A also discloses that an outer circumferential edge of an opening hole of a fuel tank and an axial end face of a flange of a filler tube are joined to each other by welding.

SUMMARY

JP2018-118498A discloses that a tubular material is extrusion-molded by an extruder and brought into close contact with inner faces of a plurality of split molds to mold the outer face of the flange with the outermost layer material over the entire length. The thickness of the flange is made greater than the thickness of a tubular body (a tubular portion adjacent to the flange in the axial direction) of the resin filler tube in order to assure a sufficient welding strength.

In this manufacturing method, for example, a speed at which the split molds are moved is reduced during molding of the flange portion, whereby the thickness of the flange is made greater than the thickness of the tubular body. That is, the speed at which the split molds are moved needs to be reduced from a speed for molding the tubular body to a speed for molding the flange portion, or the speed at which the split molds are moved needs to be increased from the speed for molding the flange portion to the speed for molding the tubular body.

In this manufacturing method, the thickness of the resin filler tube is not abruptly changed but is gradually changed. Therefore, the thickness is gradually changed at positions of the tubular body on the flange side. In a case where the thickness is increased at a portion at which the thickness of the tubular body is gradually changed, the thickness is increased inward in the radial direction at the portion at which the thickness of the tubular body is gradually changed, so that the inner diameter is reduced at the portion at which the thickness of the tubular body is gradually changed. The inner diameter of the tubular body is of importance because the inner diameter of the tubular body affects fuel flow performance. Therefore, the flange needs to be molded in consideration of the inner diameter of the tubular body.

An object of the present invention is to provide a resin filler tube that has, near a flange, an inner diameter that is not less than an inner diameter of a tubular body as a reference, and a manufacturing method for manufacturing the resin filler tube.

(1. Resin Filler Tube)

A resin filler tube is directed to a resin filler tube to be welded to an outer circumferential edge of an opening hole of a fuel tank. The resin filler tube includes: a tubular body having an outermost layer formed by using an outermost layer material, and one or more inner layers each formed by using an inner layer material; a flange having a plurality of layers that are of same kinds as those of the tubular body, the flange having a diameter greater than an outer diameter of the tubular body, a thickness greater than a thickness of the tubular body, and a predetermined width in an axial direction, the flange having a first axial end face forming a weld surface to be welded to the outer circumferential edge of the opening hole of the fuel tank; and a base-end-side reverse tapered portion having a plurality of layers that are of same kinds as those of the tubular body, the base-end-side reverse tapered portion connecting between an end of the tubular body on the fuel tank side and an end of an outer circumferential surface of the flange on a side opposite to the fuel tank side, the base-end-side reverse tapered portion being reversely tapered so as to increase a diameter toward the flange. The base-end-side reverse tapered portion is formed so as to have an inner diameter that is not less than an inner diameter of the tubular body over an entire range in the axial direction.

The resin filler tube described above includes the base-end-side reverse tapered portion. The base-end-side reverse tapered portion functions as a region in which the thickness is gradually changed between the tubular body and the flange in the axial direction. Accordingly, the base-end-side reverse tapered portion is formed so as to have the inner diameter that is not less than the inner diameter of the tubular body over the entire range in the axial direction. As a result, the inner diameter is inhibited, near the flange, from becoming less than the reference inner diameter (the inner diameter of the tubular body) in a range from the tubular body to the flange. Accordingly, fuel flow performance is prevented from being affected near the flange, and fuel flow performance exhibited by the resin filler tube indicates a desired value.

(2. Manufacturing Method for Resin Filler Tube)

A resin filler tube manufacturing method is directed to a manufacturing method for manufacturing the above-described resin filler tube. The manufacturing method includes: extruding a tubular material having a plurality of layers by an extruder; and forming the resin filler tube by bringing the tubular material into close contact with an inner face formed by a plurality of split molds while sequentially moving each of the plurality of split molds in a direction in which the tubular material is extruded, such that the resin filler tube has an outer face corresponding to the inner face.

In the forming of the resin filler tube, the tubular body has a predetermined thickness by setting moving speeds of the split molds to a first speed when the tubular material is brought into close contact with a portion of the split molds for forming the tubular body. In the forming of the resin filler tube, the flange has the thickness greater than the thickness of the tubular body by setting moving speeds of the split molds to a second speed lower than the first speed when the tubular material is brought into close contact with a portion of the split molds for forming the flange. In the forming of the resin filler tube, a thickness of the base-end-side reverse tapered portion is increased by reducing moving speeds of the split molds from the first speed to the second speed when the tubular material is brought into close contact with a portion of the split molds for forming the base-end-side reverse tapered portion.

The above-described resin filler tube is manufactured by the manufacturing method. As a result, the above-described effect is exhibited.

DESCRIPTION OF EMBODIMENTS (1. Structure of Fuel Line 1)

Figure 1:
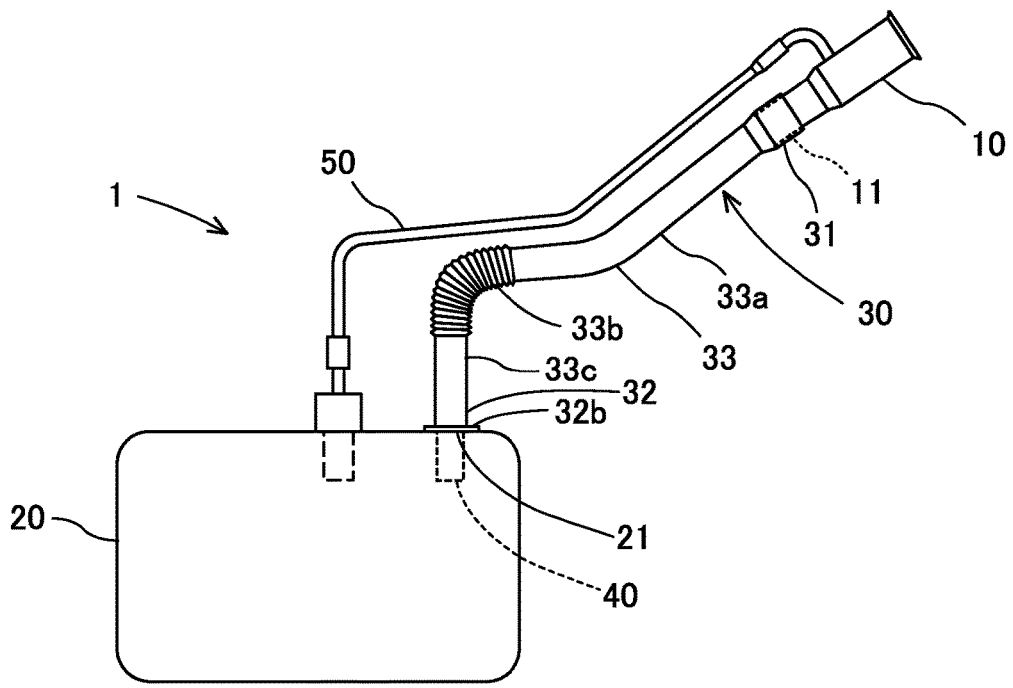
FIG. 1 illustrates a fuel line.

A structure of a fuel line 1 will be described with reference to FIG. 1. The fuel line 1 is a path extending from an oil filler port 10 through a fuel tank 20 to an internal combustion engine (not shown) in an automobile. In the present embodiment, a portion of the fuel line 1 from the oil filler port 10 to the fuel tank 20 will be described.

The fuel line 1 includes at least the oil filler port 10, the fuel tank 20, a resin filler tube 30, and a check valve 40. In the present embodiment, the fuel line 1 further includes a breather line 50.

The oil filler port 10 is disposed near the outer face of an automobile, and allows an oil supply nozzle (not shown) to be inserted therein. The oil filler port 10 is made of resin or metal. The oil filler port 10 is either an oil filler port type having an oil filler cap attached thereto, or a capless oil filler port type which does not have an oil filler cap attached thereto.

The fuel tank 20 is molded by using thermoplastic resin, and stores liquid fuel such as gasoline. The fuel tank 20 includes, for example, a plurality of kinds of resin layers. The liquid fuel stored in the fuel tank 20 is fed to the not-illustrated internal combustion engine, and is used for driving the internal combustion engine. The fuel tank 20 has an opening hole 21 for feeding fuel. The opening hole 21 for feeding fuel is formed in, for example, the upper face or the side face of the fuel tank 20.

The filler tube 30 is molded by using thermoplastic resin, and connects between the oil filler port 10 and the fuel tank 20. The filler tube 30 has one or more bent portions for routing, in general. The filler tube 30 is formed by one member or is formed by a plurality of members joined to each other. In the present embodiment, an example in which the filler tube 30 is integrally formed by one member over the entire length, will be described.

A first end portion 31 of the filler tube 30 is press-fitted to a tubular portion 11 of the oil filler port 10. A second end portion 32 of the filler tube 30 is welded to the outer circumferential edge of the opening hole 21 in the outer face of the fuel tank 20. In the present embodiment, a part of the second end portion 32 is inserted in the opening hole 21 of the fuel tank 20.

The oil supply nozzle is inserted in the oil filler port 10 and liquid fuel is fed through the oil supply nozzle, whereby the liquid fuel passes through the filler tube 30 and is stored in the fuel tank 20. In a case where the fuel tank 20 has been filled with liquid fuel, liquid fuel is stored in the filler tube 30, and the liquid fuel comes into contact with the tip of the oil supply nozzle to automatically stop feeding liquid fuel through the oil supply nozzle.

The check valve 40 is disposed near the opening hole 21 of the fuel tank 20. The check valve 40 is fixed to the second end portion 32 of the filler tube 30, or fixed between the filler tube 30 and the opening hole 21 of the fuel tank 20. When liquid fuel is fed from the filler tube 30 into the fuel tank 20, the liquid fuel passes through the check valve 40. In this case, in a case where liquid fuel is fed from the filler tube 30 into the fuel tank 20, backflow of the liquid fuel in the fuel tank 20 toward the filler tube 30 is prevented.

The breather line 50 connects between the oil filler port 10 and the fuel tank 20, and is disposed parallel to the filler tube 30. The breather line 50 is a line for discharging fuel vapor in the fuel tank 20 to the outside of the fuel tank 20 when liquid fuel is fed through the filler tube 30 into the fuel tank 20.

(2. Schematic Structure of Filler Tube 30)

Figure 2:
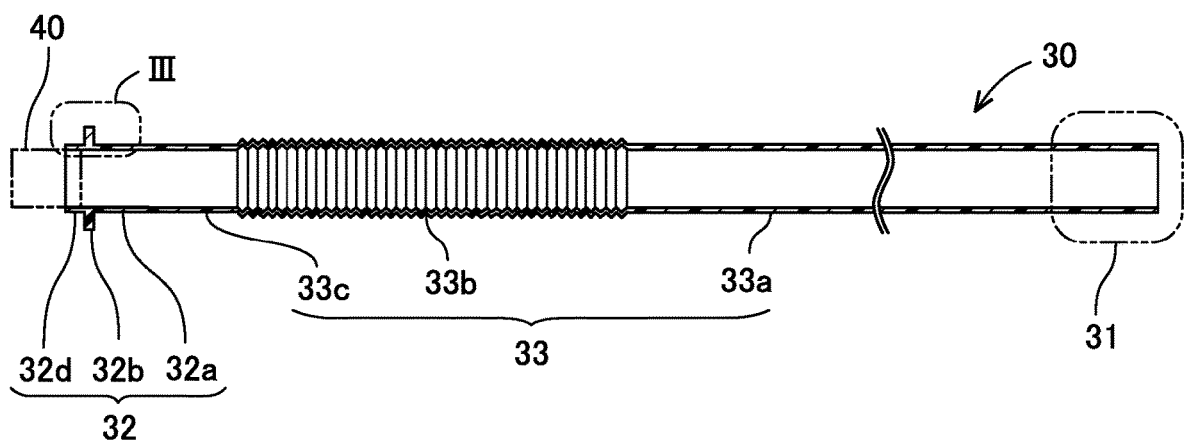
FIG. 2 is an axial cross-sectional view of a filler tube shown in FIG. 1 in a linearly extending state.

The schematic structure of the filler tube 30 will be described with reference to FIG. 2. The filler tube 30 is structured to have a plurality of layers made of different kinds of thermoplastic resins. As shown in FIG. 2, the filler tube 30 includes the first end portion 31 formed at one end portion in the tube axis direction, the second end portion 32 formed at the other end portion in the tube axis direction, and an intermediate portion 33 connecting between the first end portion 31 and the second end portion 32.

The first end portion 31 is formed in a cylindrical shape, and fitted to the outer face of the tubular portion 11 of the oil filler port 10. The first end portion 31 is formed so as to be deformed more easily than the tubular portion 11 of the oil filler port 10. Therefore, the first end portion 31 is fitted to the tubular portion 11 of the oil filler port 10 in a state where the first end portion 31 is deformed to increase the diameter.

The second end portion 32 is formed in a tubular shape, and is welded to the outer circumferential edge of the opening hole 21 of the fuel tank 20. The second end portion 32 includes a flange 32b that protrudes radially outward from a tubular body 32a over the entire circumference. The flange 32b is welded to the fuel tank 20. That is, the flange 32b of the second end portion 32 functions so as to assure a sufficient weld area for welding to the fuel tank 20. The second end portion 32 further includes a leading end tubular portion 32d extending to be closer to the leading end side of the filler tube 30 than the flange 32b. Apart of the leading end tubular portion 32d is inserted in the opening hole 21 of the fuel tank 20. The check valve 40 is attached to the inner circumferential surface of the leading end tubular portion 32d.

The intermediate portion 33 is designed as appropriate so as to form a path according to relative positions of the oil filler port 10 and the fuel tank 20 and a distance therebetween, a layout of peripheral devices, and the like. In the present embodiment, the intermediate portion 33 includes a first tubular portion 33a that does not have a bellows-like shape, a bellows portion 33b, and a second tubular portion 33c that does not have a bellows-like shape. The first tubular portion 33a is connected to the first end portion 31, and is previously bent in a mid-portion in the tube axis direction. The bellows portion 33b is connected to the first tubular portion 33a, and formed in a bellows-like tubular shape so as to be bendable as appropriate. The second tubular portion 33c is connected to the bellows portion 33b, and is also connected to the second end portion 32. The second tubular portion 33c is substantially formed in a cylindrical shape.

In an example other than the above-described example, the intermediate portion 33 of the filler tube 30 includes, for example, a plurality of the bellows portions, the entirety of the intermediate portion 33 is formed of the bellows portion, or the intermediate portion 33 includes no bellows portions. The first tubular portion 33a does not have a bellows-like shape and is bent. However, in another example, the first tubular portion 33a linearly extends.

(3. Layer Structure of Filler Tube 30)

Figure 3:
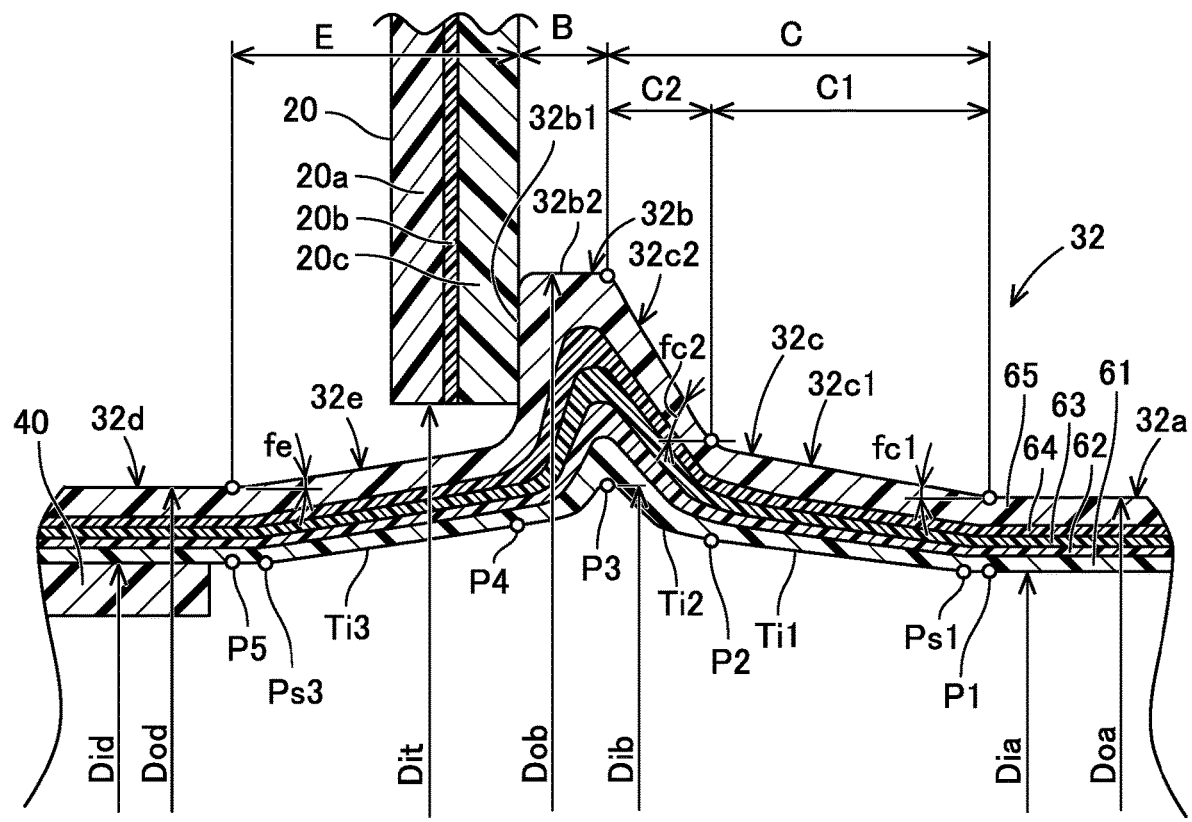
FIG. 3 illustrates a first example of a second end portion of the filler tube, illustrates an enlarged cross-section of a portion III in FIG. 2, and also illustrates a state where a flange of the filler tube is welded to an outer circumferential edge of an opening hole of a fuel tank.
Figure 4:
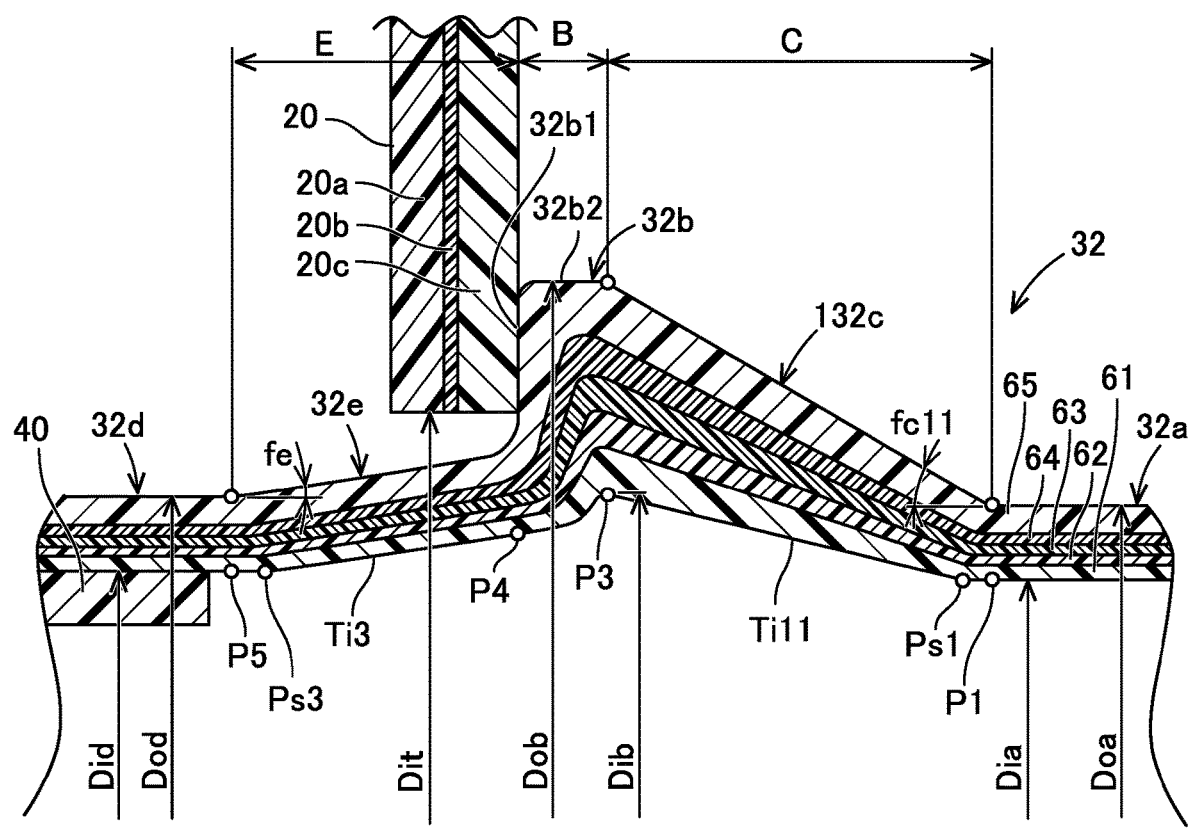
FIG. 4 illustrates a second example of the second end portion of the filler tube, illustrates an enlarged cross-section of the portion III in FIG. 2, and also illustrates a state where the flange of the filler tube is welded to the outer circumferential edge of the opening hole of the fuel tank.

A layer structure of the filler tube 30 will be described with reference to FIG. 3 and FIG. 4. FIG. 3 and FIG. 4 are each an enlarged cross-sectional view of a portion III in FIG. 2, and are axial cross-sectional views of the second end portions 32 of the filler tube 30 according to a first example and a second example. The filler tube 30 has a uniform layer structure over the entire length. Therefore, portions other than the second end portion 32 of the filler tube 30 have the same layer structure. That is, in the filler tube 30, all of the first end portion 31, the second end portion 32, and the intermediate portion 33 have the same layer structure.

As shown in FIG. 3 and FIG. 4, the filler tube 30 is structured to have a plurality of layers made of different kinds of thermoplastic resins. The filler tube 30 includes, for example, an innermost layer 61, an inner adhesive layer 62, an intermediate layer 63, an outer adhesive layer 64, and an outermost layer 65 in order, respectively, from the inner layer side. The filler tube 30 is structured to have the plurality of layers over the entire length. The structure of the filler tube 30 is not limited to the five layer structure. In another example, the number of the layers of the filler tube 30 is not greater than four or not less than six.

The layers 61 to 64 other than the outermost layer 65 are collectively referred to as inner layers. The inner layers 61 to 64 are formed of inner layer materials. The outermost layer 65 is formed of an outermost layer material. The number of the inner layers 61 to 64 is not less than one. In the present embodiment, the filler tube 30 includes the four inner layers 61 to 64. Each layer will be described below.

The innermost layer 61 comes into contact with liquid fuel (gasoline), and a gasoline-resistant material is thus used as the innermost layer material (one of the inner layer materials) of the innermost layer 61. The innermost layer 61 preferably has a catching force (disengagement preventing force) for catching the tubular portion 11 of the oil filler port 10 in the axial direction in a state where the first end portion 31 is press-fitted to the tubular portion 11 of the oil filler port 10. In this case, a material having sealability is used as the innermost layer material of the innermost layer 61. The innermost layer material of the innermost layer 61 essentially contains, for example, high density polyethylene (HDPE). However, another material is allowed to be used for the innermost layer 61 as long as the material exhibits the above-described performance.

The intermediate layer 63 is disposed on the outer circumference side of the innermost layer 61. The intermediate layer material (one of the inner layer materials) of the intermediate layer is, for example, resistant to fuel permeation. For the intermediate layer 63, for example, a material that essentially contains either ethylene-vinyl alcohol copolymer (EVOH) or polyamide (PA) is preferably used as the intermediate layer material resistant to fuel permeation. However, another material is allowed to be used for the intermediate layer 63 as long as the material exhibits the above-described performance.

The outermost layer 65 is disposed on the outer circumference side of the intermediate layer 63. The outermost layer 65 protects the intermediate layer 63. The outermost layer 65 forms the outermost surface of the filler tube 30. Therefore, for example, a material having impact resistance, weather resistance, and chemical resistance is preferably used as the outermost layer material of the outermost layer 65. In this case, for the outermost layer 65, a material that essentially contains either high density polyethylene (HDPE) or polyamide (PA) is used as the outermost layer material.

Furthermore, in the present embodiment, the outermost layer 65 forms a layer to be welded to the fuel tank 20. Therefore, a material having preferable weldability with respect to a material of the outer face of the fuel tank 20 is preferably used for the outermost layer material of the outermost layer 65. Particularly, the outermost layer material of the outermost layer 65 and the material of the outer face of the fuel tank 20 are preferably of the same kind. However, another material is allowed to be used for the outermost layer 65 as long as the material exhibits the above-described performance.

The inner adhesive layer 62 is a layer for adhering the outer circumferential surface of the innermost layer 61 and the inner circumferential surface of the intermediate layer 63 to each other. The outer adhesive layer 64 is a layer for adhering the outer circumferential surface of the intermediate layer 63 and the inner circumferential surface of the outermost layer 65 to each other. For example, a material that essentially contains modified polyethylene (modified PE) is preferably used as the inner adhesive layer material (one of the inner layer materials) of the inner adhesive layer 62 and the outer adhesive layer material (one of the inner layer materials) of the outer adhesive layer 64. However, in a case where at least one of the innermost layer 61 and the intermediate layer 63 has adhesiveness to the other thereof, the inner adhesive layer 62 is unnecessary. In a case where at least one of the intermediate layer 63 and the outermost layer 65 has adhesiveness to the other thereof, the outer adhesive layer 64 is unnecessary.

(4. Layer Structure of Fuel Tank 20)

The layer structure of the fuel tank 20 will be described with reference to FIG. 3 and FIG. 4. FIG. 3 and FIG. 4 are each a cross-sectional view of a portion near the opening hole 21 of the fuel tank 20. The fuel tank 20 is structured to have a plurality of layers made of different kinds of thermoplastic resins. The fuel tank 20 may be structured to have, for example, five layers (innermost layer, inner adhesive layer, intermediate layer, outer adhesive layer, and outermost layer), similarly to the filler tube 30.

In FIG. 3 and FIG. 4, the fuel tank 20 has a three layer structure, that is, includes an innermost layer 20a, an intermediate layer 20b, and an outermost layer 20c. The innermost layer 20a, the intermediate layer 20b, and the outermost layer 20c are, for example, formed in manners similar to manners in which the innermost layer 61, the intermediate layer 63, and the outermost layer 65, respectively, of the filler tube 30 are formed. The structure of the fuel tank 20 is not limited to the three layer structure. In another example, the number of the layers of the fuel tank 20 may be two or not less than four.

(5. First Example of Second End Portion 32 of Filler Tube 30)

Next, a first example of the second end portion 32 of the filler tube 30 will be described with reference to FIG. 3. The second end portion 32 includes the tubular body 32a, the flange 32b, a base-end-side reverse tapered portion 32c, the leading end tubular portion 32d, and a leading-end-side tapered portion 32e.

The tubular body 32a is formed in a tubular shape, and forms a portion of the second end portion 32 on the first end portion 31 side and the intermediate portion 33 side. That is, one end (not shown, the end portion located rightward of the region in FIG. 3) of the tubular body 32a is connected to the intermediate portion 33 of the filler tube 30. At least a portion of the tubular body 32a on the leading end side (the fuel tank 20 side) of the second end portion 32 is formed in a cylindrical shape. Needless to say, the tubular body 32a is allowed to be formed in a cylindrical shape having a constant diameter over the entire length. The tubular body 32a is a portion in a range rightward of a position P1 on the inner circumferential surface in FIG. 3.

The tubular body 32a is structured to have the plurality of layers (61 to 65) described above, from the inner face toward the outer face. The tubular body 32a has an outer diameter Doa and an inner diameter Dia. In the description herein, in the second end portion 32, the inner diameter Dia of the tubular body 32a is a reference inner diameter for determining fuel flow performance. That is, the inner diameter of the second end portion 32 needs to be not less than the reference inner diameter Dia over the entire length.

The flange 32b is disposed on the fuel tank 20 side than the tubular body 32a. The flange 32b protrudes radially outward relative to the tubular body 32a over the entire circumference. The outer face of the flange 32b includes a first end face 32b1 in the axial direction and an outer circumferential surface 32b2. In the present embodiment, the flange 32b is included in an axial range B. That is, in FIG. 3, the flange 32b is a portion in a range between a position P3 and a position P4 on the inner circumferential surface.

The first end face 32b1 of the flange 32b forms a weld surface to be welded to the outer circumferential edge of the opening hole 21 of the fuel tank 20. The first end face 32b1 is formed in a flat surface that is substantially orthogonal to the center axis of the second end portion 32 of the filler tube 30. The outer circumferential surface 32b2 of the flange 32b has a substantially cylindrical shape.

The flange 32b is structured to have the plurality of layers (61 to 65) that are of the same kinds as those of the tubular body 32a, from the inner face toward the outer face. Accordingly, the first end face 32b1 and the outer circumferential surface 32b2 that form the flange 32b are all molded by using the outermost layer material only. That is, a melted portion of the first end face 32b1 by welding is formed of the outermost layer material only.

The outer circumferential surface 32b2 of the flange 32b has an outer diameter Dob greater than the outer diameter Doa of the tubular body 32a. The flange 32b is filled over the entire range, in a radial range of the first end face 32b1 that is welded to the fuel tank 20. The flange 32b is formed to be thicker than the tubular body 32a.

Dib represents a maximum inner diameter of the flange 32b. In the present embodiment, the maximum inner diameter Dib of the flange 32b is less than an inner diameter Dit of the opening hole 21 of the fuel tank 20. However, the present invention is not limited thereto as long as the most of the radial range in which the to-be-welded first end face 32b1 of the flange 32b is welded to the fuel tank 20, is filled. In this case, the maximum inner diameter Dib of the flange 32b is allowed to be slightly greater than the inner diameter Dit of the opening hole 21 of the fuel tank 20.

A minimum thickness of the flange 32b is □ (Dob-Dib)/2□, and is greater than a thickness □ (Doa-Dia)/2□ of the tubular body 32a. The flange 32b has a predetermined width (length of the axial range B) in the axial direction. The width of the flange 32b is less than the minimum thickness □ (Dob-Dib)/2□.

The base-end-side reverse tapered portion 32c connects between the tubular body 32a and the flange 32b. More specifically, the base-end-side reverse tapered portion 32c connects between the end of the tubular body 32a on the fuel tank 20 side (leading end side of the second end portion 32) and the end of the outer circumferential surface 32b2 of the flange 32b on the side opposite to the fuel tank 20 side. In the present embodiment, the base-end-side reverse tapered portion 32c is included in an axial range C. That is, in FIG. 3, the base-end-side reverse tapered portion 32c is a portion in a range between the position P1 and a position P3 on the inner circumferential surface.

The length of the axial range C of the base-end-side reverse tapered portion 32c is greater than the length of the axial range B of the flange 32b. The base-end-side reverse tapered portion 32c is structured to have the plurality of layers (61 to 65) that are of the same kinds as those of the tubular body 32a, from the inner face toward the outer face.

The base-end-side reverse tapered portion 32c is reversely tapered so as to increase the diameter toward the flange 32b. More specifically, the outer circumferential surface of the base-end-side reverse tapered portion 32c is reversely tapered over the entire range in the axial direction so as to increase the diameter from the tubular body 32a toward the flange 32b. The thickness of the base-end-side reverse tapered portion 32c is increased from the tubular body 32a toward the flange 32b.

The base-end-side reverse tapered portion 32c is formed so as to have an inner diameter that is not less than the inner diameter Dia of the tubular body 32a over the entire range in the axial direction. The inner circumferential surface of the base-end-side reverse tapered portion 32c has reverse tapered portions Ti1, Ti2 so as to increase the diameter from the tubular body 32a toward the flange 32b. Accordingly, a diameter increase start position Ps1 of the reverse tapered portion Ti1 on the inner circumferential surface is included in the range of the base-end-side reverse tapered portion 32c in the axial direction, and is closer to the tubular body 32a than the flange 32b.

The base-end-side reverse tapered portion 32c includes a plurality of reverse tapered portions. In the present embodiment, the base-end-side reverse tapered portion 32c includes a first-stage reverse tapered portion 32c1 and a second-stage reverse tapered portion 32c2. The first-stage reverse tapered portion 32c1 and the second-stage reverse tapered portion 32c2 are disposed in order, respectively, from the tubular body 32a side. In another example, the base-end-side reverse tapered portion 32c includes three or more reverse tapered portions.

The first-stage reverse tapered portion 32c1 is connected to the end of the tubular body 32a on the fuel tank 20 side, and has a diameter increased toward the flange 32b. The first-stage reverse tapered portion 32c1 is included in an axial range C1. That is, in FIG. 3, the first-stage reverse tapered portion 32c1 is a portion in a range between the position P1 and a position P2 on the inner circumferential surface. The length of the axial range C1 of the first-stage reverse tapered portion 32c1 is greater than the length of the axial range B of the flange 32b. The diameter increase start position Ps1 on the inner circumferential surface is in the axial range C1 of the first-stage reverse tapered portion 32c1. That is, a portion of the first-stage reverse tapered portion 32c1 from the position P1 to the diameter increase start position Ps1 is formed so as to have the same inner diameter as the inner diameter Dia of the tubular body 32a.

A taper angle fc1 of the outer circumferential surface of the first-stage reverse tapered portion 32c1 is set such that an angle (acute angle) of the outer circumferential surface of the first-stage reverse tapered portion 32c1 relative to the center axis of the tubular body 32a is not greater than 45°. Particularly, the taper angle fc1 of the outer circumferential surface of the first-stage reverse tapered portion 32c1 is preferably not greater than 30° and more preferably not greater than 20°. A taper angle of the reverse tapered portion Ti1 on the inner circumferential surface of the first-stage reverse tapered portion 32c1 is slightly less than the taper angle fc1 of the outer circumferential surface. Accordingly, the thickness of the first-stage reverse tapered portion 32c1 is increased from the tubular body 32a toward the flange 32b.

The second-stage reverse tapered portion 32c2 connects between the end of the first-stage reverse tapered portion 32c1 and the end of the outer circumferential surface of the flange 32b on the side opposite to the fuel tank 20 side. The second-stage reverse tapered portion 32c2 is included in an axial range C2. That is, in FIG. 3, the second-stage reverse tapered portion 32c2 is a portion in a range between the position P2 and the position P3 on the inner circumferential surface. The length of the axial range C2 of the second-stage reverse tapered portion 32c2 is approximately equal to the length of the axial range B of the flange 32b or slightly greater than the length of the axial range B.

The second-stage reverse tapered portion 32c2 has a diameter increased toward the flange 32b. Furthermore, the second-stage reverse tapered portion 32c2 includes the outer circumferential surface having a taper angle fc2 greater than the taper angle fc1 of the outer circumferential surface of the first-stage reverse tapered portion 32c1. The taper angle fc2 of the outer circumferential surface of the second-stage reverse tapered portion 32c2 is set such that an angle (acute angle) of the outer circumferential surface of the second-stage reverse tapered portion 32c2 relative to the center axis of the tubular body 32a is not less than 45°. Particularly, the taper angle fc2 of the outer circumferential surface of the second-stage reverse tapered portion 32c2 is preferably not less than 50° and more preferably not less than 55°.

A taper angle of the reverse tapered portion Ti2 on the inner circumferential surface of the second-stage reverse tapered portion 32c2 is slightly less than the taper angle fc2 of the outer circumferential surface. Accordingly, the thickness of the second-stage reverse tapered portion 32c2 is increased toward the flange 32b.

The leading end tubular portion 32d is located on the leading end side of the filler tube 30. The check valve 40 is attached to the inner circumferential surface of the leading end tubular portion 32d. The leading end tubular portion 32d is structured to have the plurality of layers (61 to 65) that are of the same kinds as those of the tubular body 32a, from the inner face toward the outer face.

The leading end tubular portion 32d is formed so as to have an outer diameter Dod that is less than the inner diameter Dit of the inner circumferential surface of the opening hole 21 of the fuel tank 20 over the entire length. That is, a gap is formed between the outer circumferential surface of the leading end tubular portion 32d and the inner circumferential surface of the opening hole 21 over the entire circumference.

The leading end tubular portion 32d is formed in a cylindrical shape having a constant diameter over the entire length, a tubular shape having a plurality of diameters, or a tubular shape having a tapered portion. In the present embodiment, the leading end tubular portion 32d is formed in a cylindrical shape having a constant diameter. An inner diameter Did of the leading end tubular portion 32d is equal to the inner diameter Dia (reference inner diameter) of the tubular body 32a. The outer diameter Dod of the leading end tubular portion 32d is equal to the outer diameter Doa of the tubular body 32a.

The leading end tubular portion 32d is located radially inward of the opening hole 21 of the fuel tank 20, or located inward of the inner wall surface of the fuel tank 20. FIG. 3 shows a case where the leading end tubular portion 32d is located inward of the inner wall surface of the fuel tank 20.

The leading-end-side tapered portion 32e connects between a radially inner portion of the flange 32b and the end of the leading end tubular portion 32d on the tubular body 32a side. In the present embodiment, the leading-end-side tapered portion 32e is included in an axial range E. That is, in FIG. 3, the leading-end-side tapered portion 32e is a portion in a range between the position P4 and a position P5 on the inner circumferential surface.

The length of the axial range E of the leading-end-side tapered portion 32e is greater than the length of the axial range B of the flange 32b. The leading-end-side tapered portion 32e is structured to have the plurality of layers (61 to 65) that are of the same kinds as those of the tubular body 32a, from the inner face toward the outer face.

The leading-end-side tapered portion 32e is tapered so as to increase the diameter toward the flange 32b side. More specifically, the outer circumferential surface of the leading-end-side tapered portion 32e is tapered so as to increase the diameter from the leading end tubular portion 32d toward the flange 32b over the entire range in the axial direction. The leading-end-side tapered portion 32e is formed so as to have one tapered portion, or two or more stages of tapered portions.

The leading-end-side tapered portion 32e is formed so as to have an inner diameter that is not less than the inner diameter Did of the leading end tubular portion 32d over the entire range in the axial direction. The inner circumferential surface of the leading-end-side tapered portion 32e has a tapered portion Ti3 having a diameter increased from the leading end tubular portion 32d toward the flange 32b. Accordingly, a diameter increase start position Ps3 of the tapered portion Ti3 on the inner circumferential surface is included in a range of the leading-end-side tapered portion 32e in the axial direction, and is closer to the leading end tubular portion 32d than the flange 32b.

A taper angle fe of the outer circumferential surface of the leading-end-side tapered portion 32e is set such that an angle (acute angle) of the outer circumferential surface of the leading-end-side tapered portion 32e relative to the center axis of the tubular body 32a is not greater than 45°. Particularly, the taper angle fe of the outer circumferential surface of the leading-end-side tapered portion 32e is preferably not greater than 35° and more preferably not greater than 30°. For example, the taper angle fe of the outer circumferential surface of the leading-end-side tapered portion 32e is equal to the taper angle fc1 of the first-stage reverse tapered portion 32c1 of the base-end-side reverse tapered portion 32c. Alternatively, the taper angle fe of the outer circumferential surface of the leading-end-side tapered portion 32e is less than the taper angle fc1, fc2 of the outer circumferential surface of the base-end-side reverse tapered portion 32c over the entire range.

A taper angle of the tapered portion Ti3 on the inner circumferential surface of the leading-end-side tapered portion 32e is slightly less than the taper angle fe of the outer circumferential surface. Accordingly, the thickness of the leading-end-side tapered portion 32e is increased from the leading end tubular portion 32d toward the flange 32b.

(6. Effect of Second End portion 32 According to First Example)

As described above, the second end portion 32 of the filler tube 30 includes the base-end-side reverse tapered portion 32c. The base-end-side reverse tapered portion 32c functions as a region in which the thickness is gradually changed between the tubular body 32a and the flange 32b in the axial direction. Accordingly, the base-end-side reverse tapered portion 32c is formed so as to have the inner diameter that is not less than the inner diameter Dia of the tubular body 32a over the entire range in the axial direction. In a range from the tubular body 32a to the flange 32b, the inner diameter is inhibited, near the flange 32b, from becoming less than the reference inner diameter Dia (the inner diameter Dia of the tubular body 32a). Accordingly, fuel flow performance is prevented from being affected near the flange 32b, and fuel flow performance exhibited by the filler tube 30 indicates a desired value.

The base-end-side reverse tapered portion 32c has a plurality of stages of reverse tapered portions 32c1, 32c2. In a case where a plurality of stages of the reverse tapered portions 32c1, 32c2 are thus provided, change of an angle from the tubular body 32a to the first-stage reverse tapered portion 32c1 is reduced, and change of an angle from the first-stage reverse tapered portion 32c1 to the second-stage reverse tapered portion 32c2 is reduced. As a result, contribution to gradual change of a thickness is made. Particularly, in a case where change of an angle from the tubular body 32a to the first-stage reverse tapered portion 32c1 is reduced, the first-stage reverse tapered portion 32c1 is more likely to have an inner diameter that is not less than the inner diameter Dia of the tubular body 32a.

Furthermore, the second end portion 32 includes the leading-end-side tapered portion 32e. The leading-end-side tapered portion 32e functions as a region in which the thickness is gradually changed between the flange 32b and the leading end tubular portion 32d in the axial direction. Accordingly, the leading-end-side tapered portion 32e is formed so as to have an inner diameter that is not less than the inner diameter Did of the leading end tubular portion 32d over the entire range in the axial direction. The inner diameter is inhibited from becoming less than the inner diameter Did of the leading end tubular portion 32d in a range from the flange 32b to the leading end tubular portion 32d. Particularly, in a case where the inner diameter Did of the leading end tubular portion 32d is equal to the inner diameter Dia of the tubular body 32a, the inner diameter is inhibited, near the flange 32b, from becoming less than the reference inner diameter Dia (the inner diameter Dia of the tubular body 32a).

(7. Second Example of Second End Portion 32 of Filler Tube 30)

Next, a second example of the second end portion 32 will be described with reference to FIG. 4. The second end portion 32 includes the tubular body 32a, the flange 32b, a base-end-side reverse tapered portion 132c, the leading end tubular portion 32d, and the leading-end-side tapered portion 32e. In the second example, the tubular body 32a, the flange 32b, the leading end tubular portion 32d, and the leading-end-side tapered portion 32e have the same structures as those of the first example, and the base-end-side reverse tapered portion 132c is different from the base-end-side reverse tapered portion 32c of the first example. Difference of the second example from the first example will be described below.

As shown in FIG. 4, the base-end-side reverse tapered portion 132c connects between the tubular body 32a and the flange 32b. More specifically, the base-end-side reverse tapered portion 132c is formed so as to have one predetermined taper angle in a range from the end of the tubular body 32a on the fuel tank 20 side to the end of the outer circumferential surface of the flange 32b on the side opposite to the fuel tank 20 side. In the present embodiment, the base-end-side reverse tapered portion 132c is included in the axial range C. That is, in FIG. 4, the base-end-side reverse tapered portion 132c is a portion in a range between the position P1 and the position P3 on the inner circumferential surface.

The length of the axial range C of the base-end-side reverse tapered portion 132c is greater than the length of the axial range B of the flange 32b. Furthermore, the base-end-side reverse tapered portion 132c is structured to have the plurality of layers (61 to 65) that are of the same kinds as those of the tubular body 32a, from the inner face toward the outer face.

The base-end-side reverse tapered portion 132c is reversely tapered so as to increase the diameter toward the flange 32b. More specifically, the outer circumferential surface of the base-end-side reverse tapered portion 132c is reversely tapered at one taper angle so as to increase the diameter from the tubular body 32a toward the flange 32b in the entire range (the main portion excluding connection portions on both ends) in the axial direction. However, the base-end-side reverse tapered portion 132c is smoothly connected at a portion connecting to the tubular body 32a and at a portion connecting to the flange 32b.

A taper angle fc11 of the outer circumferential surface of the base-end-side reverse tapered portion 132c is set such that an angle (acute angle) of the outer circumferential surface of the base-end-side reverse tapered portion 132c relative to the center axis of the tubular body 32a is not greater than 45°. Particularly, the taper angle fc11 of the outer circumferential surface of the base-end-side reverse tapered portion 132c is preferably not greater than 40° and more preferably not greater than 35°. The taper angle fc11 of the outer circumferential surface of the base-end-side reverse tapered portion 132c is preferably not less than 20° and particularly preferably not less than 25°.

A taper angle of a reverse tapered portion Ti11 of the inner circumferential surface of the base-end-side reverse tapered portion 132c is slightly less than the taper angle fc11 of the outer circumferential surface. Accordingly, the thickness of the base-end-side reverse tapered portion 132c is increased from the tubular body 32a toward the flange 32b. The taper angle fe of the outer circumferential surface of the leading-end-side tapered portion 32e is less than the taper angle fc11 of the outer circumferential surface of the base-end-side reverse tapered portion 132c over the entire range.

The base-end-side reverse tapered portion 132c is formed so as to have an inner diameter that is not less than the inner diameter Dia of the tubular body 32a over the entire range in the axial direction. The inner circumferential surface of the base-end-side reverse tapered portion 132c has the reverse tapered portion Ti11 so as to increase the diameter from the tubular body 32a toward the flange 32b. Accordingly, a diameter increase start position Ps1 of the reverse tapered portion Ti11 on the inner circumferential surface is included in a range of the base-end-side reverse tapered portion 132c in the axial direction, and is closer to the tubular body 32a than the flange 32b. That is, a portion of the base-end-side reverse tapered portion 132c from the position P1 to the diameter increase start position Ps1 is formed so as to have the inner diameter equal to the inner diameter Dia of the tubular body 32a.

(8. Effect of Second End Portion 32 According to Second Example)

As described above, the second end portion 32 of the filler tube 30 includes the base-end-side reverse tapered portion 132c. The base-end-side reverse tapered portion 132c functions as a region in which the thickness is gradually changed between the tubular body 32a and the flange 32b in the axial direction. Accordingly, the base-end-side reverse tapered portion 132c is formed so as to have the inner diameter that is not less than the inner diameter Dia of the tubular body 32a over the entire range in the axial direction. The inner diameter is inhibited, near the flange 32b, from becoming less than the reference inner diameter Dia (the inner diameter Dia of the tubular body 32a) in a range from the tubular body 32a to the flange 32b. Accordingly, fuel flow performance is prevented from being affected near the flange 32b, and fuel flow performance exhibited by the filler tube 30 indicates a desired value.

(9. Method for Manufacturing Tank Unit (20, 30, 40))

Next, a method for manufacturing the tank unit (20, 30, 40) that includes the fuel tank 20, the filler tube 30, and the check valve 40 will be described with reference to FIG. 5.

Firstly, the filler tube 30 is manufactured (S1: □filler tube manufacturing step□). The filler tube 30 is formed by extrusion molding. Accordingly, in the filler tube manufacturing step S1, a primary material 30a (shown in FIG. 6) is formed by extrusion molding (S11), and a secondary material 30b (shown in FIG. 6) is formed by corrugation forming (S12), and the secondary material 30b is finally cut, thereby forming the filler tube 30 (S13). The method for manufacturing the filler tube 30 will be described below in more detail.

The fuel tank 20 is prepared (manufactured) (S2: □fuel tank preparing step□). The check valve 40 is prepared (S3: □check valve preparing step□). Subsequently, the check valve 40 is attached to the second end portion 32 of the filler tube 30 (S4: □check valve attaching step□). Subsequently, the second end portion 32 of the filler tube 30 is disposed at the position (welding initial position) of the opening hole 21 of the fuel tank 20 (S5: □initial position disposition step□). Subsequently, the flange 32b of the second end portion 32 of the filler tube 30 and the outer circumferential edge of the opening hole 21 of the fuel tank 20 are welded to each other (S6: □welding step□). In a case where the check valve 40 can be attached after the welding, step S4 may be performed after step S6.

(10. Structure of Manufacturing Apparatus 100 for Filler Tube 30)

Figure 6:
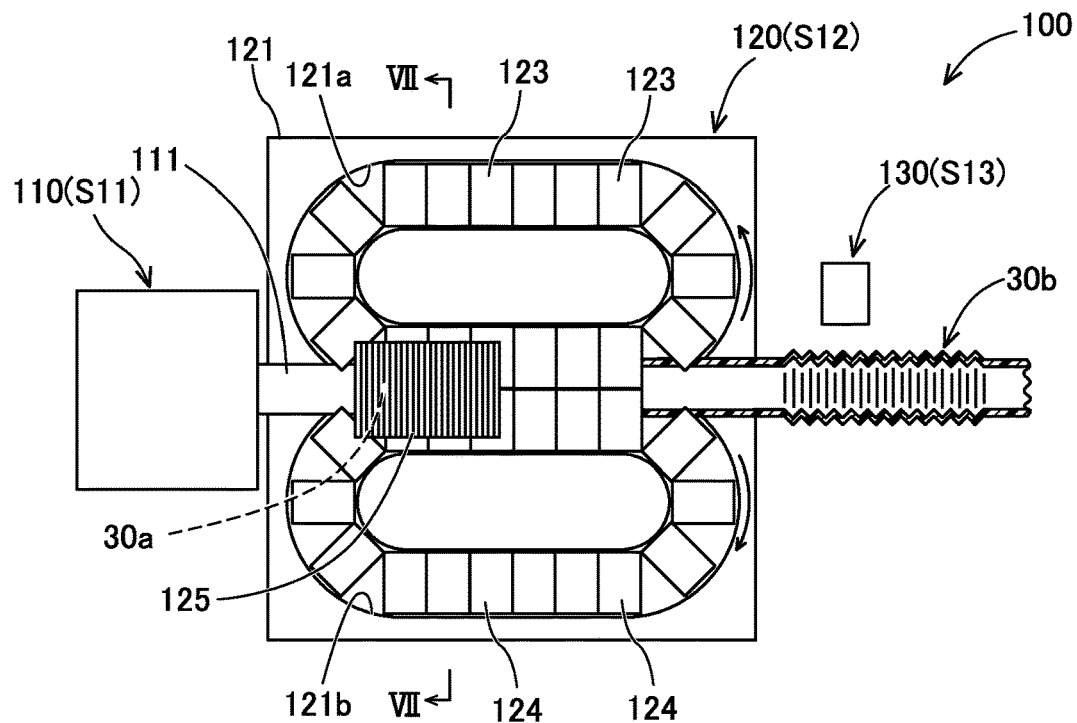
FIG. 6 is a plan view of a manufacturing apparatus for manufacturing the filler tube.
Figure 7:
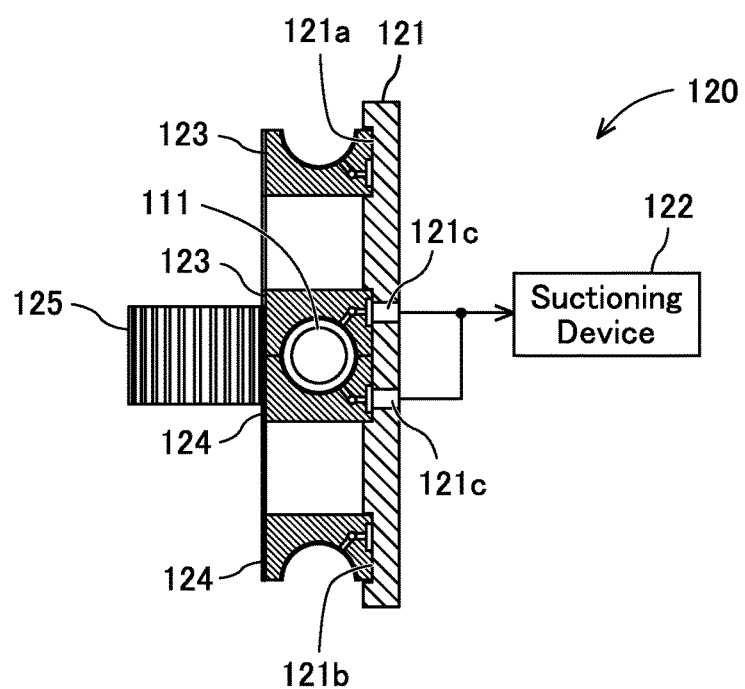
FIG. 7 is a cross-sectional view taken along a line VII-VII in FIG. 6.

Next, the structure of a manufacturing apparatus 100 for manufacturing the filler tube 30 will be described with reference to FIG. 6 and FIG. 7. The filler tube 30 is manufactured by the manufacturing apparatus 100 shown in FIG. 6. The manufacturing apparatus 100 includes an extruder 110, a corrugation molding machine 120 arranged continuously with the extruder 110, and a cutting machine 130 arranged continuously with the corrugation molding machine 120.

Figure 5:
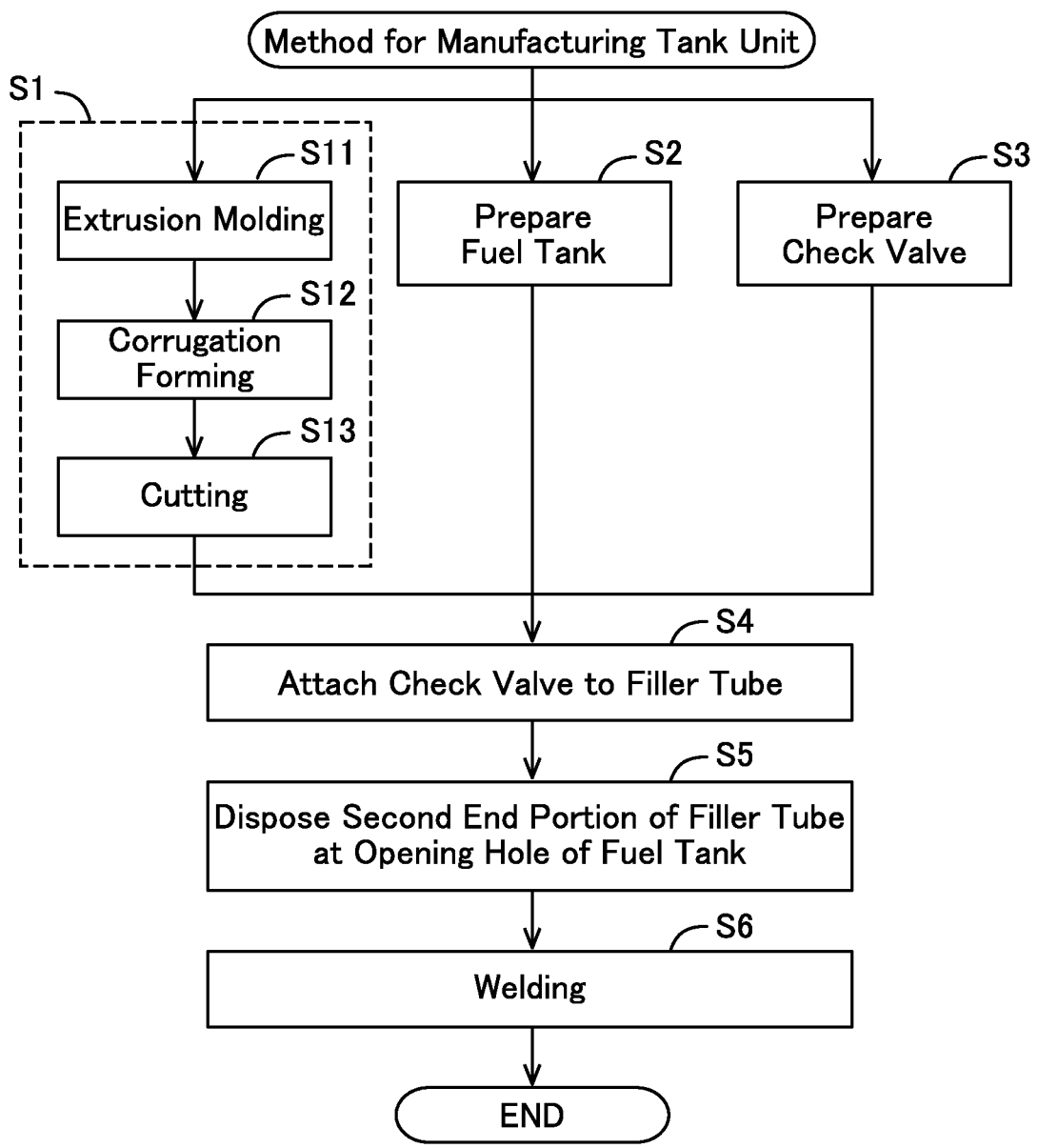
FIG. 5 is a flow chart showing a method for manufacturing a tank unit (fuel tank, filler tube, check valve)

That is, the tubular primary material 30a (tubular material) is formed by the extruder 110 (S11 in FIG. 5), the tubular secondary material 30b is formed by the corrugation molding machine 120 (S12 in FIG. 5), and the filler tube 30 is formed by the cutting machine 130 (S13 in FIG. 5).

The extruder 110 performs extrusion molding to form the tubular primary material 30a. The primary material 30a is structured to have a plurality of layers (61 to 65) as shown in FIG. 3 and FIG. 4, and is formed in a cylindrical shape having a constant inner diameter and a constant outer diameter in the axial direction. That is, the primary material 30a is formed so as to have a constant thickness in the radial direction as a whole, and each layer is also formed so as to have a constant thickness in the radial direction. An extruding speed of the extruder 110 is adjustable to any speed.

While sequentially moving each of a plurality of split molds 123, 124 in the direction in which the primary material 30a is extruded, the corrugation molding machine 120 brings the primary material 30a into close contact with an inner face formed by the plurality of split molds 123, 124 to form the secondary material 30b that corresponds to the filler tube 30 having an outer face corresponding to the inner face.

The corrugation molding machine 120 is used for a portion at which the shape of the primary material 30a formed through extrusion molding by the extruder 110 is changed. In the present embodiment, the corrugation molding machine 120 is mainly used for forming the bellows portion 33b and forming the second end portion 32. The corrugation molding machine 120 is used for changing the outer diameter of the primary material 30a also in a portion having a cylindrical shape.

The corrugation molding machine 120 includes a guide table 121, a suctioning device 122, a plurality of the split molds 123, 124, and a drive gear 125. An ellipsoidal first guide groove 121a and a second guide groove 121b which has the same shape as the first guide groove 121a and which is disposed adjacent to the first guide groove 121a are formed in the upper face of the guide table 121. Furthermore, communication holes 121c that communicate with the first guide groove 121a and the second guide groove 121b are formed in the guide table 121, as shown in FIG. 7. As shown in FIG. 7, the suctioning device 122 is connected to the communication holes 121c in the guide table 121, and suctions air in a space communicating with the communication holes 121c.

A plurality of first split molds 123 are molds for shaping one of two portions into which the filler tube 30 is divided along the axial direction. The plurality of first split molds 123 are sequentially moved on and along the first guide groove 121a of the guide table 121. That is, each of the plurality of first split molds 123 is sequentially moved to form a half part of the filler tube 30. Each of the plurality of first split molds 123 has a rack gear on the upper face.

A plurality of second split molds 124 are molds for shaping the other of the two portions into which the filler tube 30 is divided along the axial direction. The plurality of second split molds 124 are sequentially moved on and along the second guide groove 121*b* of the guide table 121. That is, each of the plurality of second split molds 124 is sequentially moved to form a remaining half part of the filler tube 30. Each of the plurality of second split molds 124 has a rack gear on the upper face.

A portion of the first split molds 123 and a portion of the second split molds 124 each have a shaping surface corresponding to the bellows portion 33*b*. Another portion of the first split molds 123 and another portion of the second split molds 124 each have a shaping surface corresponding to the second end portion 32.

A discharge opening of a nozzle 111 of the extruder 110 is disposed at a position, on the extruder 110 side, of a pair of molds formed by combining the plurality of first split molds 123 and the plurality of second split molds 124 with each other. That is, the primary material 30*a* is suctioned onto the inner circumferential surfaces of the pair of molds 123, 124 located at the position and thus shaped.

The drive gear 125 is a pinion gear for moving the plurality of first split molds 123 and the plurality of second split molds 124. The drive gear 125 is disposed on the extruder 110 side of the pair of molds formed by combining the plurality of first split molds 123 and the plurality of second split molds 124 with each other. The drive gear 125 meshes with the first split molds 123 and the second split molds 124, and is driven to rotate, whereby the plurality of first split molds 123 and the plurality of second split molds 124 are sequentially moved.

Furthermore, moving speeds of the plurality of split molds 123, 124 are changed by changing a rotation speed of the drive gear 125. Increase of the moving speeds of the plurality of split molds 123, 124 causes the filler tube 30 to have a thickness reduced in the radial direction at portions corresponding to the split molds 123, 124 located near the nozzle 111 of the extruder 110. Meanwhile, reduction of the moving speeds of the plurality of split molds 123, 124 causes the filler tube 30 to have a thickness increased in the radial direction at portions corresponding to the split molds 123, 124 located near the nozzle 111 of the extruder 110.

Specifically, in a case where the moving speeds of the split molds 123, 124 are set as a first speed, the tubular body 32*a* has a predetermined thickness. In a case where the moving speeds of the split molds 123, 124 are set as a second speed that is lower than the first speed, the thickness of the flange 32*b* becomes greater than the thickness of the tubular body 32*a*. Furthermore, in a case where the moving speeds of the split molds 123, 124 are gradually reduced from the first speed to the second speed, the thickness of the base-end-side reverse tapered portion 32*c*, 132*c* is gradually increased.

In a case where the moving speeds of the split molds 123, 124 are set as a third speed that is higher than the second speed, the thickness of the leading end tubular portion 32*d* becomes less than the thickness of the flange 32*b*. Furthermore, in a case where the moving speeds of the split molds 123, 124 are gradually increased from the second speed to the third speed, the thickness of the leading-end-side tapered portion 32*e* is gradually reduced.

The secondary material 30*b* discharged from the corrugation molding machine 120 has a shape continuous in the axial direction. That is, the continuous secondary material 30*b* has such a shape that a plurality of the filler tubes 30 connect to each other. Therefore, the continuous secondary material 30*b* shaped by the corrugation molding machine 120 is cut, by the cutting machine 130, so as to have a predetermined length, thereby forming each filler tube 30.

The filler tube 30 described above is manufactured by the manufacturing method. Particularly, the primary material 30*a* formed by extrusion molding is shaped by the split molds 123, 124, thereby forming the secondary material 30*b*.

In the manufacturing method, the thickness of the filler tube 30 is not abruptly changed but is gradually changed. Therefore, the thickness is gradually increased from the tubular body 32*a* toward the flange 32*b*. The base-end-side reverse tapered portion 32*c*, 132*c* is located at the gradually changed portion. Accordingly, in a case where the base-end-side reverse tapered portion 32*c*, 132*c* is provided, the thickness is gradually increased, and the thickness is also prevented from being increased in the radially inward direction between the tubular body 32*a* and the flange 32*b*. Accordingly, the inner diameter of the base-end-side reverse tapered portion 32*c*, 132*c* is not less than the inner diameter Dia of the tubular body 32*a*.

The thickness is gradually reduced from the flange 32*b* toward the leading end tubular portion 32*d*. The leading-end-side tapered portion 32*e* is located at the gradually changed portion. Accordingly, in a case where the leading-end-side tapered portion 32*e* is provided, the thickness is gradually reduced, and the thickness is also prevented from being increased in the radially inward direction between the flange 32*b* and the leading end tubular portion 32*d*. Accordingly, the inner diameter of the leading-end-side tapered portion 32*e* is not less than the inner diameter Did of the leading end tubular portion 32*d*.

What is claimed is:
1. A resin filler tube to be welded to an outer circumferential edge of an opening hole of a fuel tank, the resin filler tube comprising:
   a tubular body having an outermost layer formed by using an outermost layer material, and one or more inner layers each formed by using an inner layer material;
   a flange having a plurality of layers that are of same kinds as those of the tubular body, the flange having a diameter greater than an outer diameter of the tubular body, a thickness greater than a thickness of the tubular body, and a predetermined width in an axial direction, the flange having a first axial end face forming a weld surface to be welded to the outer circumferential edge of the opening hole of the fuel tank; and
   a base-end-side reverse tapered portion having a plurality of layers that are of same kinds as those of the tubular body, the base-end-side reverse tapered portion connecting between an end of the tubular body on the fuel tank side and an end of an outer circumferential surface of the flange on a side opposite to the fuel tank side, the base-end-side reverse tapered portion being reversely tapered so as to increase a diameter toward the flange, wherein
   the base-end-side reverse tapered portion is formed so as to have an inner diameter that is not less than an inner diameter of the tubular body over an entire range in the axial direction, and
   the base-end-side reverse tapered portion includes:
      a first-stage reverse tapered portion connected to the end of the tubular body on the fuel tank side, the first-stage reverse tapered portion having a diameter increased toward the flange, and a second-stage reverse tapered portion connecting between an end of the first-stage reverse tapered portion and the end of the outer circumferential surface of the flange on the side opposite to the fuel tank side, the second-stage reverse tapered portion having a diameter increased toward the flange, the second-stage reverse tapered portion having an outer circumferential surface that has a taper angle greater than a taper angle of an outer circumferential surface of the first-stage reverse tapered portion.

2. The resin filler tube according to claim 1, wherein an inner circumferential surface of the base-end-side reverse tapered portion has a reverse tapered portion having a diameter increased toward the flange.

3. The resin filler tube according to claim 1, wherein the taper angle of the outer circumferential surface of the first-stage reverse tapered portion is set such that an angle of the outer circumferential surface of the first-stage reverse tapered portion relative to a center axis of the tubular body is not greater than 45°.

4. The resin filler tube according to claim 1, wherein a length of the base-end-side reverse tapered portion in the axial direction is greater than a length of the flange in the axial direction.

5. The resin filler tube according to claim 1, wherein at least a portion of the tubular body on the fuel tank side is formed in a cylindrical shape.

6. A manufacturing method for manufacturing the resin filler tube according to claim 1, the manufacturing method comprising:

extruding a tubular material having a plurality of layers by an extruder; and forming the resin filler tube by bringing the tubular material into close contact with an inner face formed by a plurality of split molds while sequentially moving each of the plurality of split molds in a direction in which the tubular material is extruded, such that the resin filler tube has an outer face corresponding to the inner face, wherein the tubular body has a predetermined thickness by setting moving speeds of the split molds to a first speed when the tubular material is brought into close contact with a portion of the split molds for forming the tubular body, in the forming of the resin filler tube, the flange has the thickness greater than the thickness of the tubular body by setting moving speeds of the split molds to a second speed lower than the first speed when the tubular material is brought into close contact with a portion of the split molds for forming the flange, in the forming of the resin filler tube; and a thickness of the base-end-side reverse tapered portion is increased by reducing moving speeds of the split molds from the first speed to the second speed when the tubular material is brought into close contact with a portion of the split molds for forming the base-end-side reverse tapered portion, in the forming of the resin filler tube.

7. A resin filler tube to be welded to an outer circumferential edge of an opening hole of a fuel tank, the resin filler tube comprising:

a tubular body having an outermost layer formed by using an outermost layer material, and one or more inner layers each formed by using an inner layer material;

a flange having a plurality of layers that are of same kinds as those of the tubular body, the flange having a diameter greater than an outer diameter of the tubular body, a thickness greater than a thickness of the tubular body, and a predetermined width in an axial direction, the flange having a first axial end face forming a weld surface to be welded to the outer circumferential edge of the opening hole of the fuel tank;

a base-end-side reverse tapered portion having a plurality of layers that are of same kinds as those of the tubular body, the base-end-side reverse tapered portion connecting between an end of the tubular body on the fuel tank side and an end of an outer circumferential surface of the flange on a side opposite to the fuel tank side, the base-end-side reverse tapered portion being reversely tapered so as to increase a diameter toward the flange;

a leading end tubular portion having a plurality of layers that are of same kinds as those of the tubular body, the leading end tubular portion being located at a leading end side of the resin filler tube, and located radially inward of the opening hole of the fuel tank or located inward of an inner wall surface of the fuel tank; and a leading-end-side tapered portion having a plurality of layers that are of same kinds as those of the tubular body, the leading-end-side tapered portion connecting between a radially inner portion of the flange and an end of the leading end tubular portion on the tubular body side, the leading-end-side tapered portion being tapered so as to have a diameter increased toward the flange, wherein:

the base-end-side reverse tapered portion is formed so as to have an inner diameter that is not less than an inner diameter of the tubular body over an entire range in the axial direction, and the leading-end-side tapered portion has an inner diameter that is not less than an inner diameter of the leading end tubular portion over an entire range in the axial direction.

8. The resin filler tube according to claim 7, wherein an inner circumferential surface of the leading-end-side tapered portion has a tapered portion having a diameter increased toward the flange.

9. The resin filler tube according to claim 7, wherein the inner diameter of the tubular body is equal to the inner diameter of the leading end tubular portion.

10. The resin filler tube according to claim 7, wherein a taper angle of an outer circumferential surface of the leading-end-side tapered portion is less than a taper angle of an outer circumferential surface of the base-end-side reverse tapered portion, over the entire range.

11. The resin filler tube according to claim 7, wherein the leading end tubular portion is formed in a cylindrical shape.

12. A manufacturing method for manufacturing the resin filler tube according to claim 7, the manufacturing method comprising:

extruding a tubular material having a plurality of layers by an extruder; and forming the resin filler tube by bringing the tubular material into close contact with an inner face formed by a plurality of split molds while sequentially moving each of the plurality of split molds in a direction in which the tubular material is extruded, such that the resin filler tube has an outer face corresponding to the inner face, wherein the tubular body has a predetermined thickness by setting moving speeds of the split molds to a first speed when the tubular material is brought into close contact with a portion of the split molds for forming the tubular body, in the forming of the resin filler tube, the flange has the thickness greater than the thickness of the tubular body by setting moving speeds of the split molds to a second speed lower than the first speed when the tubular material is brought into close contact with a portion of the split molds for forming the flange, in the forming of the resin filler tube, a thickness of the base-end-side reverse tapered portion is increased by reducing moving speeds of the split molds from the first speed to the second speed when the tubular material is brought into close contact with a portion of the split molds for forming the base-end-side reverse tapered portion, in the forming of the resin filler tube, a thickness of the leading end tubular portion is made less than the thickness of the flange by setting moving speeds of the split molds to a third speed higher than the second speed when the tubular material is brought into close contact with a portion of the split molds for forming the leading end tubular portion, in the forming of the resin filler tube; and a thickness of the leading-end-side tapered portion is reduced by increasing moving speeds of the split molds from the second speed to the third speed when the tubular material is brought into close contact with a portion of the split molds for forming the leading-end-side tapered portion, in the forming of the resin filler tube.

13. The resin filler tube according to claim 7, wherein an outer circumferential surface of the base-end-side reverse tapered portion is formed so as to have one predetermined taper angle in a range from the end of the tubular body on the fuel tank side to the end of the outer circumferential surface of the flange on the side opposite to the fuel tank side.

14. The resin filler tube according to claim 13, wherein a taper angle of the outer circumferential surface of the base-end-side tapered portion is set such that an angle of the outer circumferential surface of the base-end-side reverse tapered portion relative to a center axis of the tubular body is not greater than 45°.

* * * * *